Figure 1:
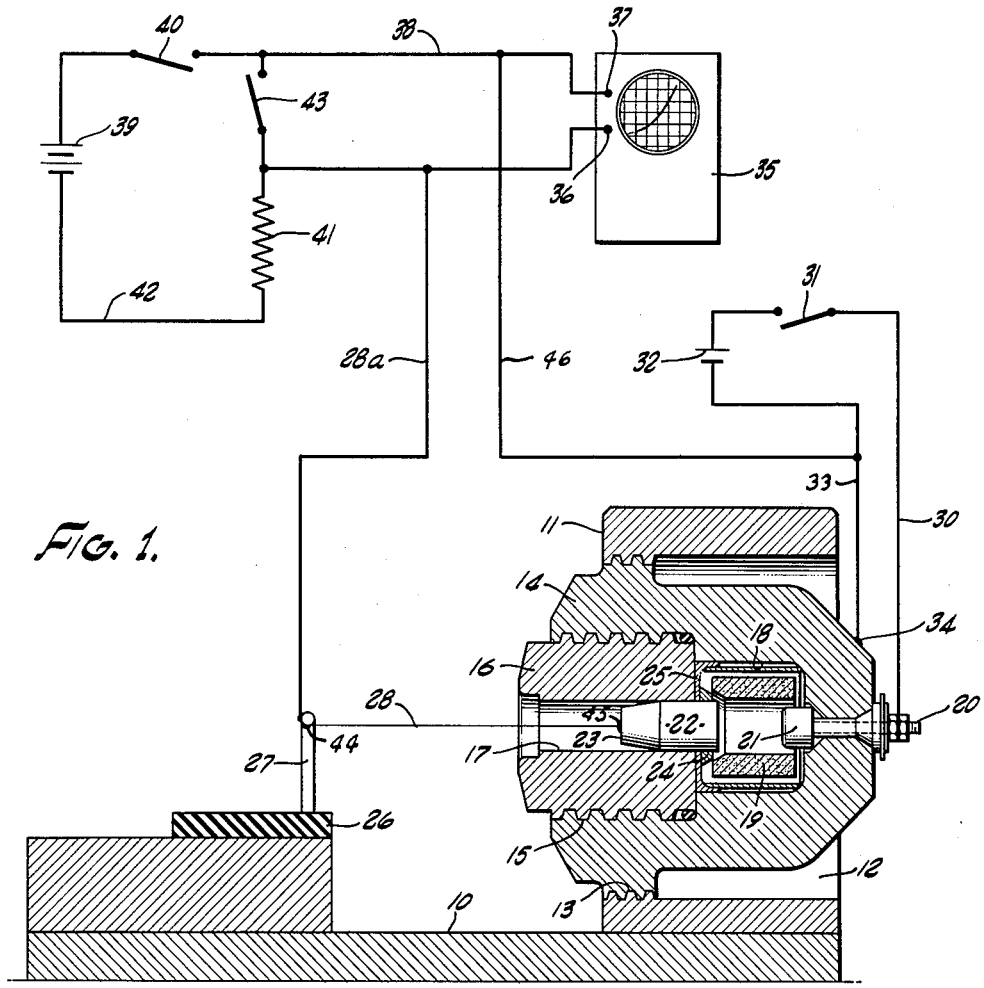

July 17, 1956  R. A. WHITMORE  2,755,439
BULLET VELOCITY MEASUREMENT
Filed Nov. 12, 1952

RAYMOND A. WHITMORE
INVENTOR.

BY
ATTORNEY

United States Patent Office 2,755,439
Patented July 17, 1956

2,755,439

BULLET VELOCITY MEASUREMENT

Raymond A. Whitmore, La Habra, Calif., assignor, by mesne assignments, to Lane-Wells Company, Los Angeles, Calif., a corporation of California Application November 12, 1952, Serial No. 319,874

7 Claims. (Cl. 324—70)

This invention relates to ballistics, and more especially to means for measuring and indicating the acceleration and velocity of a bullet during its movement through a gun barrel bore. At the present time guns are being used extensively for industrial purposes, such as mining and the opening up of earth formations in oil and gas wells and the perforation of well casings, and in the ballistics art in this field there is a constant need for improved means for determining gun performance. Guns of the type used in the completion and servicing of oil and gas wells have barrels of limited length, of the order of 2 to 3 inches, and in studies involving the measurement of bullet travel, acceleration, and velocity in the very short time duration of movement of the bullet through the gun barrel, the types of test data that can be obtained from such guns under such difficult conditions have been quite limited and of questionable accuracy. This doubtful accuracy is understandable when it is considered that the time element involved in such measurements in guns of the before-mentioned size is of the order of 150 microseconds or less.

In order to improve the performance of bullet type gun perforators, it is important that certain of these measurements be made for comparison with a theoretical or ideal standard of performance. The major and more important measurements are the internal gun pressures and bullet movement during the polytropic expansion of the propulsive charge gases, and these measurements must be obtained as the bullet travels its first few fractions of an inch, and until the bullet leaves the barrel of the gun. This travel may be measured as a function of time or pressure, as desired. The present invention is based on the discovery that the travel of a bullet in a gun barrel can be made to change the resistance of a resistance element such as a flexible or collapsible wire which is positioned axially in front of the bullet in such a manner that the end portion of the wire progressively collapses and piles up on or crumples against the forward face of the bullet in a compact, conductive mass, while the balance of the wire not yet reached by the bullet, due to inertia effects, remains substantially unmoved and undeformed which has the effect of shorting out the portion of the wire so accumulated on the forward end of the bullet, thereby changing the effective length and thereby the electrical resistance of such wire in proportion to the displacement of the bullet. With the wire and bullet arranged in a suitable electrical circuit, a corresponding potential variation is thereby obtained which can be detected and amplified and utilized to obtain a visual or graphic representation of bullet displacement or velocity, relative to time or combustion chamber pressure.

The apparatus used in this invention preferably includes a cathode ray oscillograph for measuring the potential variation corresponding to bullet travel versus time, but it will be understood that the invention is not limited to such measuring means and that other suitable types of electrical measuring apparatus may be used.

It is therefore the general purpose and object of the invention to provide novel means and apparatus for measuring and recording bullet travel versus time in a gun barrel.

A more specific object of the invention is to provide means for indicating the instantaneous position of a bullet in a gun barrel.

Another object of the invention is to provide an improved device for optically indicating and recording the acceleration and velocity of a bullet during its movement through a gun barrel bore.

Figure 2:
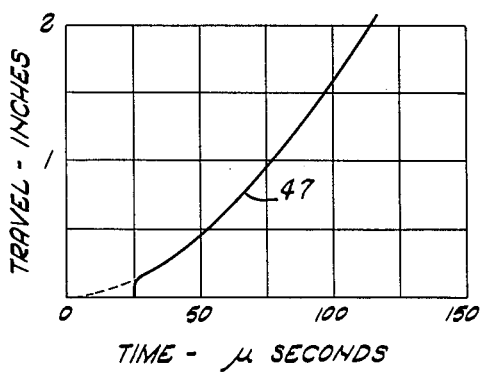

The foregoing and other objects and advantages will appear and be brought out more fully in the following specification, considered together with the accompanying drawing forming a part thereof and in which:

Figure 1 is a view in longitudinal sectional elevation of a test gun, and a diagram of the electrical circuit associated therewith for carrying out the invention; and Figure 2 is a typical graphical record made with the apparatus of Figure 1, showing the travel versus time of the bullet.

As shown in the drawing, a base 10 supports an adapter 11 which has a cavity 12 in which is secured, by a threaded connection 13, a gun body 14. Body 14 has a threaded bore 15 which receives and secures a gun barrel 16 having a bullet bore 17. Body 14 also has a charge chamber 18 which contains a propulsive powder charge 19, and an electrical igniter which comprises pin 20 extends outwardly through the rear end of gun body 14 and has an electrical igniter cap 21 at its inner end adjacent the powder charge 19. A bullet 22 having a flat forward face 23 is positioned in bore 17 and is initially secured in position by a ring 24 fastened to an annular flange member 25 positioned in the forward end of charge chamber 18. An insulating block 26 is suitably mounted on base 10 and supports an upright pin 27, the upper end of which intersects the forwardly extended axis of the bullet bore 17. An elongated resistance element 28 is secured under tension, preferably although not necessarily coaxial with the bullet bore 17, and in the path of movement of the bullet, between the upper end of pin 27 and the center of face 23 of the bullet 22, being secured to the pin and bullet face by any suitable means, such as soldered connections as indicated at 44 and 45. Igniter pin 20 is connected by a conductor 30 through a switch 31 to one terminal of a battery 32, the other terminal of which is connected by a conductor 33 to a suitable ground terminal 34 on gun body 14. A cathode ray oscilloscope 35 has one of its input terminals 36 connected by a conductor 28a to resistance wire terminal pin 27, and has its other input terminal 37 connected by a conductor 38 to one terminal of a battery 39 through a switch 40. Conductor 28a is also connected to one end of a noninductive wire wound resistor 41, the other end of which is connected by a conductor 42 to the other terminal of battery 39. Conductor 38 is connected to the gun body 14 through conductors 46 and 33. A calibrating switch 43 is connected between conductors 28a and 38. Resistance element 28 may be made of various materials and take various suitable forms. In the apparatus herein illustrated, element 28 preferably comprises a suitable length of fine wire preferably, although not necessarily, a resistance wire and may be of any desired length suitable to the length of the gun to be tested. Best operation is probably limited to barrels of relatively short length, and in the present apparatus the barrel has a length of approximately 3 inches. The resistances of conductors 28a and 46 are preferably such as to be practically negligible as compared to the resistance of the useful portion of the resistance element 28.

The apparatus is prepared for operation by the closing of battery switch 40, whereby a current is caused to flow from the battery 39 to resistance element 28 by way of conductor 42, resistor 41, and conductor 28a and return through bullet 22, gun body 14, conductors 33, 46, and 38, and switch 40. The resultant potential drop across resistance element 28 appears between the conductors 28a and 46 and is thereby applied to the input terminals 36 and 37 of the oscilloscope 35. The oscilloscope is first calibrated by one or more momentary closings of calibrating switch 43 for shorting out the resistance wire 28, and by adjusting the oscilloscope vertical sweep amplification the vertical deflection of the electron beam may be made to correspond to a predetermined scale value within the limits of the oscilloscope screen. This deflection is momentary in nature, but by triggering the calibration switch repeatedly, it can be easily viewed on the oscilloscope screen. The oscilloscope horizontal sweep speed is similarly adjusted to a suitable value within the limits of the oscilloscope screen, a single sweep being triggered each time a small electrical impulse is applied at terminals 36 and 37, thereby synchronizing the initiation of the horizontal sweep with the vertical deflection to give a full display of the trace on the screen. A suitable camera attached to the oscilloscope may be employed to produce a photographic oscillograph of the type shown in Figure 2 for record and study.

After the oscilloscope has been thus calibrated, the apparatus is ready for operation, and upon closing of ignition switch 31, igniter cap 21 will fire the propulsive charge 19, and the bullet 22 will be accelerated outwardly through the gun barrel bore 17 toward pin 27. During this movement of the bullet, the resistance element 28 will pile up on the forward flat end 23 of the bullet, thus progressively shorting out that portion of the wire adjacent the forward end of the bullet, with the remainder of the wire keeping its original coaxial position due to its inertia, during this extremely rapid movement of the bullet, the duration of which may be of the order of 150 microseconds or less. As this shorting action of resistance element 28 progresses, the voltage across terminals 36 and 37 will be varied in proportion to the effective change in resistance of the element, and thus in proportion to the displacement or travel of the bullet through the barrel, and this voltage change and corresponding bullet travel will be reflected in a corresponding vertical deflection of the oscilloscope trace.

At substantially the same instant that the switch 31 is closed to ignite the charge 19, as before described, the electrical pulse applied at terminals 36 and 37, as a result of the initial forward movement of the bullet and resultant change of the effective resistance of the resistance element 28, triggers the horizontal sweep of the oscilloscope beam, which then moves horizontally across the screen at a substantially uniform rate proportional to time. The combined horizontal sweep and vertical deflection of the oscilloscope beam results in a trace or curve such as illustrated at 47 in Figure 2, in which the bullet travel relative to time is shown.

As hereinbefore mentioned, the vertical deflection and horizontal sweep of the oscilloscope may be so adjusted as to represent on a suitable scaled or ruled grid, bullet displacement in inches as ordinates versus time in microseconds as abscissae, respectively, in the manner illustrated in Figure 2.

In testing a gun having a bore length of approximately 2 inches, a 3-inch length of Nichrome wire, .0015" in diameter and having a resistance of 87 ohms, was employed at 28. Other resistance wires and materials may be employed provided the diameter of the wire for the given material is such as to give sufficient flexibility to the wire to permit it to pile up properly upon the forward end of the moving projectile, and not be materially deformed throughout the remainder of its length between the projectile and the opposite supporting means. A suitable resistance value of the resistor 41 was 3000 ohms, and a battery of 90 volts was employed at 39. The value of the resistor 41 preferably should be large as compared to the resistance of the resistance element 28 so that the current output from battery 39 through the resistance element 28 will be substantially constant. Variations may obviously be made in the equipment to suit the type and size of gun to be tested and type of oscilloscope or oscillograph employed.

It is to be understood that the foregoing is illustrative only, and that the invention is not to be limited thereby, but includes all modifications thereof within the scope of the invention as defined in the appended claims.

What is claimed is:

1. Apparatus for measuring the velocity of a projectile projected at relatively high velocity from a propelling means, comprising: an elongated flexible resistance element initially extending forwardly from said projectile and adapted to have electrical contact therewith; means for supporting the end of said element forwardly of said projectile; means for projecting said projectile in a substantially straight path along the path occupied by said resistance element; and means for measuring with respect to time the changing resistance of a predetermined portion of said resistance element, said portion comprising that part of said wire initially extending between the forward end of said projectile in the initial position thereof and the forward end of said projectile at the time the base end of said projectile leaves said propelling means.

2. Apparatus for measuring the velocity of a projectile projected at relatively high velocity from a propelling device, comprising the combination of: a stationary support; an elongated longitudinally collapsible resistance element; means for securing one end of said resistance element to said projectile; means for securing the opposite end of said resistance element to said stationary support; means for projecting said projectile substantially parallel to the longitudinal axis of said resistance element at relatively high velocity; means for measuring the resistance of a portion of said resistance element extending between said stationary support and said projectile; and means for indicating the changing value with respect to time of said resistance during movement of said projectile along the axis of said resistance element.

3. The combination, in apparatus for measuring the velocity of a projectile ejected from a propelling device at relatively high velocity, of: an elongated, longitudinally collapsible resistance element; means for securing one end of said resistance element to the forward end portion of said projectile; a stationary support disposed forward of and substantially coaxial with said projectile; means for securing the other end of said resistance element to said support; means for ejecting said projectile at relatively high velocity from said propelling device; and means for indicating with respect to time the resultant changing value of the resistance of at least a portion of said resistance element.

4. Apparatus for measuring the velocity of a projectile projected at relatively high velocity from a propelling device, comprising: an elongated longitudinally collapsible resistance element; means for securing one end of said resistance element to said projectile; means for projecting said projectile parallel to the longitudinal axis of said resistance element at relatively high velocity; means for measuring the resistance of a portion of said resistance element extending forwardly from said projectile; and means for indicating the changing value with respect to time of said measured resistance during movement of said projectile along the said axis of said resistance element.

5. Apparatus for measuring the velocity of a projectile projected at relatively high velocity from a propelling device comprising: an elongated, collapsible resistance element; means initially supporting said resistance element with its longitudinal axis in and substantially parallel to the path of movement of said projectile from said propelling device, said resistance element being of such physical characteristics as to progressively collapse substantially only at the point of contact thereof upon the forward end portion of such projectile under the impact of said projectile therewith as such projectile moves forward through said path, whereby the effective length of said resistance element is thereby changed and at a rate determined by the rate of forward movement of such projectile; and means for making a measure of the rate of change of resistance of at least a portion of said resistance element due to the aforesaid change in effective length thereof.

6. Apparatus for measuring the velocity of a projectile projected at relatively high velocity from a barrel comprising: a gun barrel; a projectile in said barrel; an elongated flexible resistance element initially extending forwardly from the forward end portion of said projectile and adapted to collapse progressively against the forward end portion of said projectile when said projectile is fired from said gun barrel, thereby changing the effective length and consequently the resistance of said resistance element, said gun barrel, said projectile and said elongated resistance element thereby initially being connected in series with one another to form a series circuit the resistance of which is adapted to change as the effective length of said resistance element is changed as aforesaid; and means connected to said series circuit for indicating the rate of change of the resistance.

7. Apparatus for measuring the velocity of a projectile projected at relatively high velocity from a barrel comprising: a gun barrel; a projectile in said barrel; an elongated flexible resistance element initially extending forwardly from the forward end portion of said projectile and adapted to collapse progressively against the forward end portion of said projectile when said projectile is fired from said gun barrel, thereby changing the effective length and consequently the resistance of said resistance element, said gun barrel, said projectile and said elongated resistance element thereby initially being connected in series with one another to form a series circuit the resistance of which is adapted to change as the effective length of said resistance element is changed as aforesaid; and means connected to said series circuit for indicating the time interval between the initial forward movement of said projectile in said barrel and the time said series circuit is interrupted by said projectile leaving said barrel.

References Cited in the file of this patent

UNITED STATES PATENTS

| | | |
|---|---|---|
| 2,475,387 | Golden | July 5, 1949 |
| 2,498,045 | Looney et al. | Feb. 21, 1950 |
| 2,514,297 | Smith et al. | July 4, 1950 |
| 2,517,133 | Porter | Aug. 1, 1950 |
| 2,564,416 | Wildhack | Aug. 14, 1951 |
| 2,613,536 | Jakosky | Oct. 14, 1952 |